US010009606B2

(12) United States Patent
Bulusu et al.

(10) Patent No.: US 10,009,606 B2
(45) Date of Patent: Jun. 26, 2018

(54) LOW POWER CONTEXT ADAPTIVE BINARY ARITHMETIC DECODER ENGINE

(71) Applicant: NVIDIA Corporation, Santa Clara, CA (US)

(72) Inventors: Ravi Bulusu, Hyderabad (IN); Harikrishna Reddy, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 434 days.

(21) Appl. No.: 13/650,079

(22) Filed: Oct. 11, 2012

(65) Prior Publication Data

US 2014/0105272 A1 Apr. 17, 2014

(51) Int. Cl.
| | |
|---|---|
| H04N 19/10 | (2014.01) |
| H04N 19/13 | (2014.01) |
| H04N 19/157 | (2014.01) |
| H04N 19/179 | (2014.01) |
| H04N 19/44 | (2014.01) |
| H04N 19/42 | (2014.01) |

(52) U.S. Cl.
CPC ....... *H04N 19/00006* (2013.01); *H04N 19/13* (2014.11); *H04N 19/157* (2014.11); *H04N 19/179* (2014.11); *H04N 19/439* (2014.11); *H04N 19/44* (2014.11)

(58) Field of Classification Search
CPC combination set(s) only.
See application file for complete search history.

(56) References Cited

U.S. PATENT DOCUMENTS

| | | | | |
|---|---|---|---|---|
| 6,935,959 B2* | 8/2005 | Danieli | ............... | A63F 13/12 463/35 |
| 7,385,535 B2* | 6/2008 | Yang | ............... | H03M 7/4006 341/107 |
| 2003/0185306 A1* | 10/2003 | MacInnis et al. | ....... | 375/240.25 |
| 2004/0028141 A1* | 2/2004 | Hsiun | ............... | H04N 9/641 375/240.25 |
| 2005/0232505 A1* | 10/2005 | Pearson | ............... | H04N 19/42 382/247 |
| 2006/0023795 A1* | 2/2006 | Kim | ............... | H03M 7/4006 375/242 |
| 2008/0013633 A1* | 1/2008 | Ye et al. | ............... | 375/240.24 |
| 2008/0120676 A1* | 5/2008 | Morad et al. | ............... | 725/127 |
| 2008/0137753 A1* | 6/2008 | He | ............... | 375/240.24 |
| 2009/0096643 A1* | 4/2009 | Chang | ............... | 341/51 |
| 2009/0279613 A1* | 11/2009 | Suzumura | ............... | 375/240.25 |
| 2010/0272172 A1* | 10/2010 | Chiba | ............... | 375/240.02 |
| 2011/0032985 A1* | 2/2011 | Jang et al. | ............... | 375/240.02 |

\* cited by examiner

*Primary Examiner* — Christopher S Kelley
*Assistant Examiner* — Asmamaw G Tarko
(74) *Attorney, Agent, or Firm* — Artegis Law Group, LLP

(57) ABSTRACT

A technique for decoding data within a context-based adaptive binary arithmetic coding (CABAC) stream processes one or more bins of compressed data based on video format parameters associated with the stream. A configurable CABAC decoder circuit cascades one or more instances of CABAC bin decoder logic to operate properly within a timing constrain established by a decoder clock frequency. The decoder may advantageously select among different combinations of decoder clock frequency and decoded bins per clock cycle to minimize power consumption associated with decompressing and playing the compressed data.

23 Claims, 6 Drawing Sheets

LOW POWER CONTEXT ADAPTIVE BINARY ARITHMETIC DECODER ENGINE

BACKGROUND OF THE INVENTION

Field of the Invention

The present invention generally relates to video decoder systems, and more specifically, to a low power context adaptive binary arithmetic decoder engine.

Description of the Related Art

Digital video playback represents an important capability for modern digital mobile devices. Video compression and decompression technology is fundamental to enabling efficient playback and use of constrained resources associated with mobile devices. Video information comprises sequential frames of two-dimensional color and intensity information. Uncompressed video information typically represents each pixel of color and intensity information within a frame directly. Compressing the video information typically involves removing redundant or unimportant information within a given frame, and removing redundant or unimportant information between frames. For example, a discrete cosine transform (DCT) may be used to remove two-dimensional spectral information from blocks of pixels that is unimportant to human perception. Motion estimation and compensation serves to remove information that is redundant between frames by representing a new frame in terms of changes relative to a previous frame. A key consequence of removing redundant and unimportant information is that compressed video information typically requires less data than a corresponding sequence of uncompressed video information. The compressed video information typically comprises a structured data stream having certain syntax elements that allow a decompression engine to uniquely parse the structured data stream and recreate a sequence of uncompressed frames, which may then be displayed.

One highly efficient video compression and decompression technique known in the art is the International Telecommunications Union (ITU) recommendation H.264 for advanced video coding for generic audiovisual services, simply "H.264." This technique organizes compressed video as an ordered data stream comprising a hierarchy of objects, starting with a sequence one or more frames, where a frame comprises one or more slices, and where a slice comprises one or more macroblocks, each of which may comprise one or more sub-macroblock partitions. The hierarch continues so that each sub-macroblock may include one or more blocks, and each a block may include a set of samples, each of which comprises a color and intensity value for an individual pixel. Encoding video information according to H.264 comprises describing video frames based on a set of encoding and compression tools. Such tools are associated with syntax elements comprising the ordered data stream.

One aspect of H.264 comprises entropy coding for certain syntax elements. Entropy coding is a computationally intensive technique for performing lossless compression of repeating vectors of arbitrary bit length. In particular, H.264 implements a technique known in the art as context-based adaptive binary arithmetic coding (CABAC), which may be efficiently implemented directly in logic circuits. A CABAC circuit conventionally operates on a bin of data per iteration to generate a decoded string and a context update to be applied when operating on a subsequent bin of data. In conventional systems implementing H.264, a video decoder pipeline comprises different pipeline stages built from logic circuits that are configured to operate synchronously with respect to the CABAC circuit. Inherent complexity associated with different stages of the decoder pipeline, including a CABAC stage, dictates a maximum operating frequency of the video decoder pipeline. The video decoder pipeline is typically able to operate on a range of video resolutions and formats, each having a different data throughput requirement. The video decoder pipeline needs to be designed to accommodate a certain maximum data throughput based the most demanding video format supported, and each video format having a lower throughput characteristic simply places less overall load on the video decoder pipeline, which is conventionally designed to operate at a fixed speed.

One consequence of implementing a configurable design for the video decoder pipeline based on the maximum data throughput requirement is that the video decoder pipeline is typically overpowered with respect to typical usage cases, leading to superfluous dissipation of power and reduced battery life.

As the foregoing illustrates, what is needed in the art is a technique for improved power efficiency in configurable video decoder pipelines.

SUMMARY OF THE INVENTION

One embodiment of the present invention sets forth a method for configuring a decoder circuit to decode one or more units of encoded video data per processing cycle, the method comprising reading one or more video format parameters associated with the encoded video data, determining a decoder configuration for the decoder circuit based on the one or more video format parameters, wherein the decoder configuration includes at least a certain number of units of encoded video data, and configuring the decoder circuit to process a number of units of encoded video data per processing cycle based on the decoder configuration.

Other embodiments of the present invention include, without limitation, a computer-readable storage medium including instructions that, when executed by a processing unit, cause the processing unit to perform the techniques described herein as well as a computing device that includes a processing unit configured to perform the techniques described herein.

One advantage of the present invention is that a video decoder may reconfigure a context-based adaptive binary arithmetic coding (CABAC) decoder circuit to decode a number of bins corresponding to reduced power consumption based on a specific item of video content being decoded.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
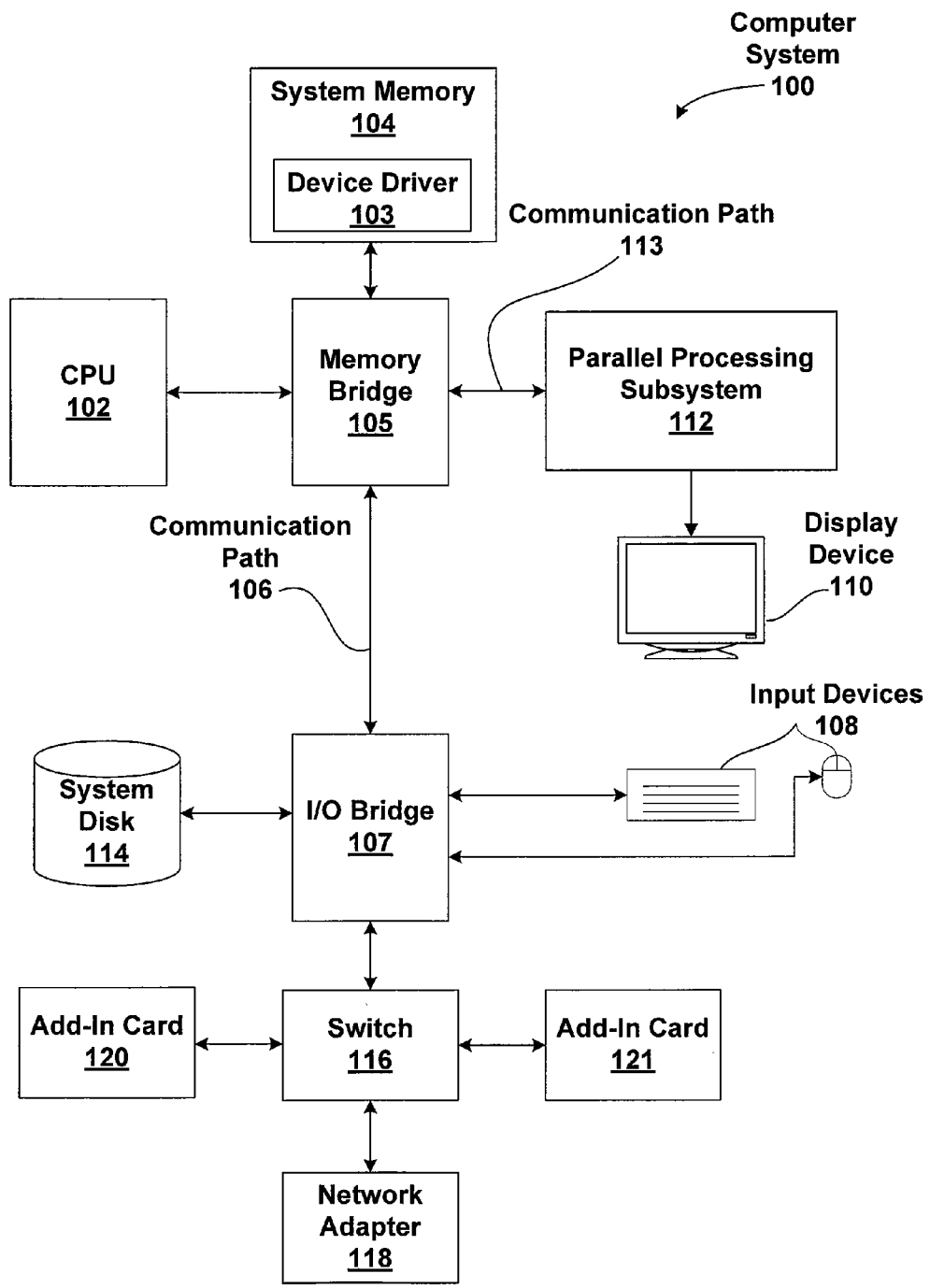
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
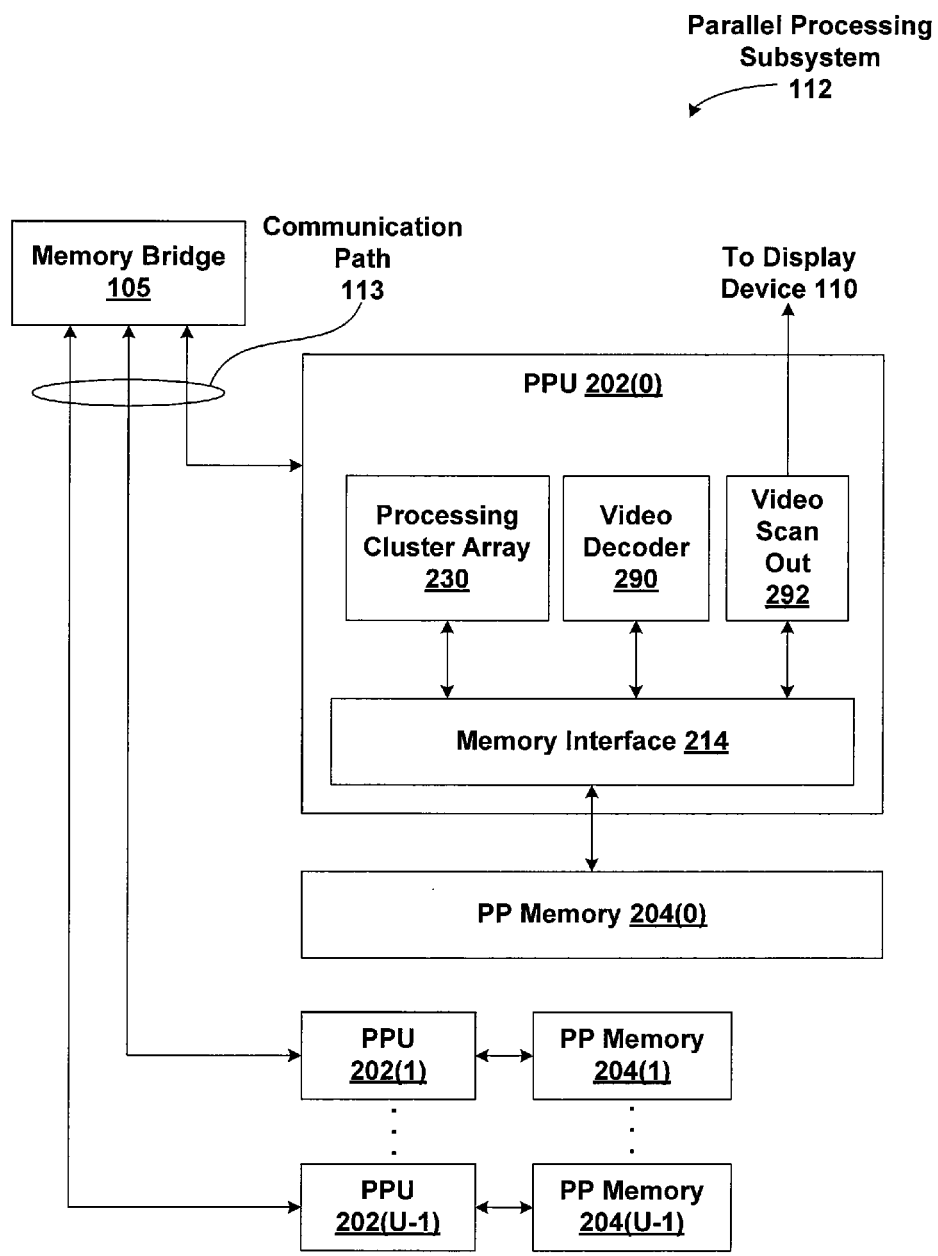
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 is coupled to computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used.

Each PPU 202 advantageously implements a highly parallel processing architecture comprising processing cluster array 230, which includes a number C of general processing clusters (GPCs). Each GPC is capable of executing a large number (e.g., hundreds or thousands) of threads concurrently, where each thread is an instance of a program. In various applications, different GPCs may be allocated for processing different types of programs or for performing different types of computations. The allocation of GPCs may vary dependent on the workload arising for each type of program or computation.

Memory interface 214 includes a number D of partition units that are each directly coupled to a portion of parallel processing memory 204, where D≥1. In one embodiment, the number of partition units generally equals the number of dynamic random access memory (DRAM) devices or groups of devices within PP memory 204. In other embodiments, the number of partition units may not equal the number of memory devices. Persons of ordinary skill in the art will appreciate that DRAM devices may be replaced with other suitable storage devices and can be of generally conventional design. A detailed description is therefore omitted. Render targets, such as frame buffers or texture maps may be stored across the DRAMs devices, allowing partition units to write portions of each render target in parallel to efficiently use the available bandwidth of parallel processing memory 204.

Any one of GPCs may process data to be written to any of the DRAM devices within parallel processing memory 204. A crossbar unit within memory interface 214 is configured to route the output of each GPC to the input of any partition unit or to another GPC for further processing. The GPCs communicate with memory interface 214 through the crossbar unit to read from or write to various external memory devices, such as the DRAM devices.

PPUs 202 may transfer data from system memory 104 and/or local PP memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

A video decoder 290 is configured to generate a decompressed video stream from a compressed video stream. In one embodiment, the decompressed video stream comprises frames of video data, each representing a two-dimensional array of pixel values that may be displayed or stored. The compressed video stream comprises an ordered data stream of hierarchical objects, each representing an element of a frame of video data. The compressed video stream may reside within system memory 104, PP memory 204, other storage associated with computer system 100, or any combination thereof. Similarly, the decompressed video stream may reside within system memory 104, PP memory 204, other storage associated with computer system 100, or any combination thereof. In one embodiment, the decompressed video stream is stored within a video output buffer comprising one or more frames of decompressed video data associated with PP memory 204. A video scan out module 292 is configured to read the video output buffer and transmit a corresponding video signal to display device 110. The video output buffer may comprise a circular buffer having two or more video frames.

Any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Video Decoding Pipeline

Figure 3:
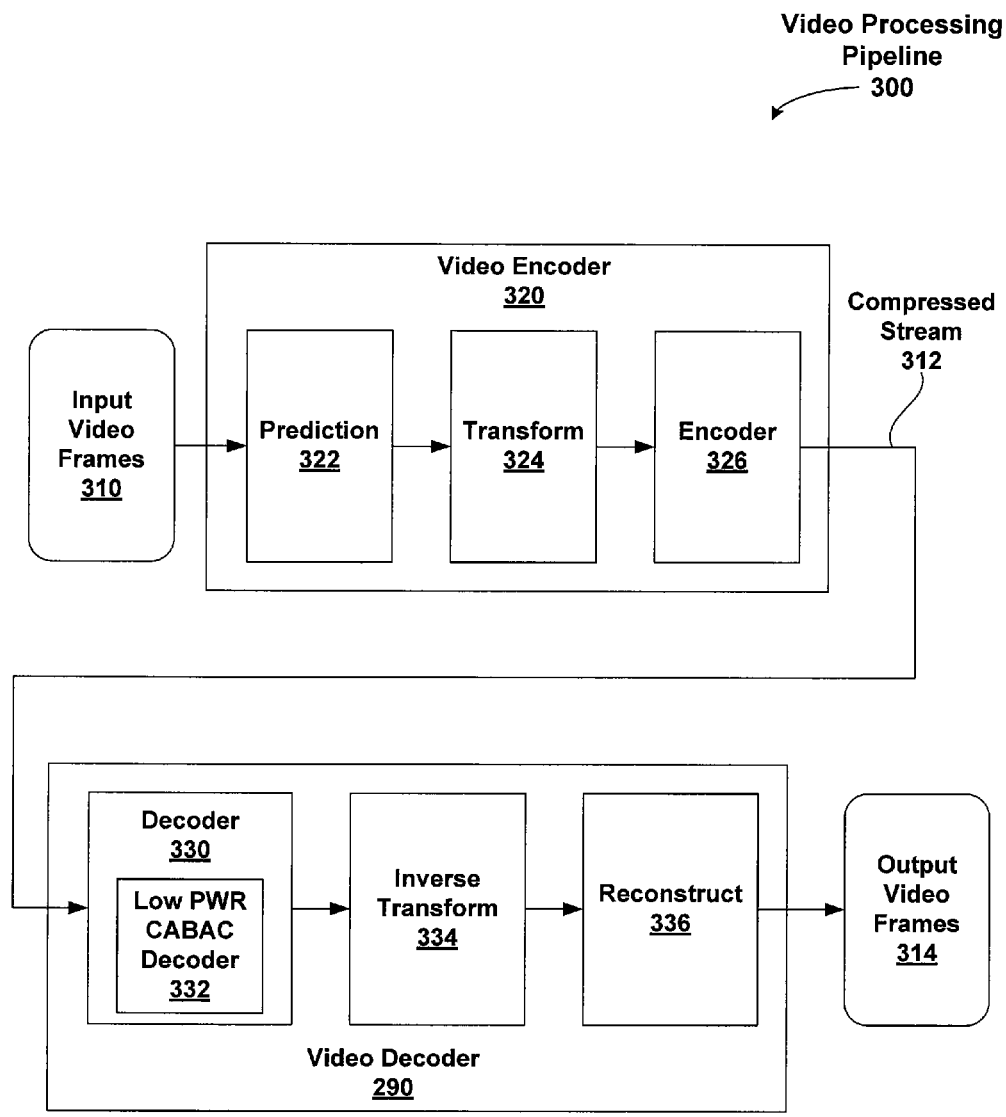
FIG. 3 is a block diagram of a video processing pipeline configured to implement one or more aspects of the present invention.

FIG. 3 is a block diagram of a video processing pipeline 300 configured to implement one or more aspects of the present invention. Specific implementation details related to video processing pipeline 300 have been omitted for clarity. Persons skilled in the art will recognize the overall process and flow of video processing pipeline 300 as being consistent with the well-known ITU recommendation H.264 (or simply "H.264"). In one embodiment, compressed stream 312 conforms to H.264. Video decoder 290 may be implemented as a sub-circuit of parallel processing subsystem 112 of FIG. 1 and configured to read compressed stream 312 from a sequential buffer residing within system memory 104 or PP memory 204. Computer system 100 may retrieve video data comprising compressed stream 312 from system disk 114 or network adapter 118 and store the video data within the sequential buffer for playback by video decoder 290.

Video processing pipeline 300 includes a video encoder 320 configured to compress a sequence of input video frames 310 and generate a compressed stream 312, and a video decoder 290 configured to generate uncompressed output video frames 314 from compressed stream 312. Input video frames 310 may comprise stored data or live data. Compressed stream 312 may be stored for later use or streamed live to video decoder 290. Similarly, output video frames 314 may be stored or viewed live. For example, output video frames 314 may be viewed live on display device 110 of FIG. 1. Compressed stream 312 includes a sequential stream of syntax elements that can describe a frame of video data, either as a stand-alone frame, or as differences relative to a previous frame of video data.

Video encoder 320 includes a prediction unit 322, a transform unit 324, and an encoder unit 326. Prediction unit 322 generates a description of differences between at least one previous frame and a current frame on a macroblock granularity. Differences between corresponding previous macroblock information and current information are described as a residual data, which may be efficiently compressed via a transform performed by transform unit 324 and a quantization step on transformed data. On example of a transform performed by transform unit 324 is a discrete cosine transform (DCT). A DCT generates a set of weights for a predefined set of basis functions. When combined later in inverse transform unit 334 of video decoder 290, the set of weights applied to the basis functions recreate original, pre-transformed data. Each weight in the set of weights is quantized, which has the effect of decreasing precision, but also has the effect of reducing the number of bits necessary to represent the set of weights. A quantization parameter may be used to vary how much precision is lost and consequentially, how much compression is achieved in quantization.

Encoder unit 326 generates compressed stream 312 by encoding quantized frame data as well as other compressed frame data needed by video decoder 290 for decoding and reconstructing a frame of video data. Such compressed frame data may include syntax elements converted to a variable length code, such as a lossless entropy code for binary representation of the frame data. One particularly efficient entropy code is referred to in the art as context-based adaptive binary arithmetic coding (CABAC). In one embodiment, encoder unit 326 implements CABAC encoding based on ITU recommendation H.264 to generate compressed stream 312.

Video decoder 290 includes decoder unit 330, inverse transform unit 334, and reconstruction unit 336. Decoder unit 330 is configured to parse compressed stream 312 and generate decoded information for generating output video frames 314. The decoded information includes the set of weights for macroblocks comprising a frame, as well as construction information for reconstructing a current frame of video data, potentially based on a previous frame of video data and changes to the previous frame of video data that result in the current frame of video data. Decoder unit 330 implements a low power CABAC decoder 332 for decoding entropy encoded information. Low power CABAC decoder 332 may decode residual data, which is then transmitted to inverse transform unit 334 for regenerating macroblock color information. Low power CABAC decoder 332 may also decode slice reconstruction data related to overall frame reconstruction. Inverse transform unit 334 reconstructs macroblock color data based on decoded data from decoder unit 330. Reconstruction unit 336 assembles output video frames based on the reconstructed macroblock color data as well as slice reconstruction data and frame information to generate output video frames 314.

Video processing pipeline 300 is designed to operate in one of a set of different video formats, each having a defined frame resolution, frame rate, and compression rate. At least one of the different video formats defines a maximum throughput requirement for video processing pipeline 300, and each processing stage is designed to satisfy the maximum throughput requirement. In a practical implementation, video decoder 290 is designed to process compressed stream 312 and generate output video frames 314 comprising a sequence of video frames generated from compressed stream 312. A format parameter specifies a particular video format for output video frames 314 and implies an associated throughput requirement to support generating the output video frames 314.

In a conventional video decoder, entropy decoding operations associated with a CABAC decoder represent a processing bottleneck. The conventional video decoder is designed to operate at a clock frequency that satisfies the maximum throughput requirement. When configured to decode video formats with a lower throughput requirement, certain circuits within the conventional video decoder may experience lower utilization at the clock frequency, and therefore superfluously dissipate power because they are being clocked at an unnecessarily high frequency. A conventional CABAC decoder is configured to operate on one bin per clock cycle at the clock frequency.

In contrast to conventional video decoders, video decoder 290 may be configured to operate over a range of clock frequencies, and optionally over a range of operating voltages, to optimize power consumption based on a particular video format. For certain video formats, low power CABAC decoder 332 needs to process an integral multiple of bins relative to a required clock frequency for the inverse transform unit 334 and reconstruction unit 336 to maintain a sufficient throughput. When the required clock frequency is sufficiently low, low power CABAC decoder 332 may be configured to process two or more bins per clock cycle. At higher clock frequencies, logic propagation delays within low power CABAC decoder 332 limit the number of bins that may be processed per clock cycle. In one embodiment, low power CABAC decoder 332 processes one bin per clock cycle at the maximum throughput and two bins per clock cycle at a lower throughput threshold. In certain embodiments, low power CABAC decoder 332 processes three bins per clock cycle at a still lower throughput threshold. Persons skilled in the art will recognize that low power CABAC decoder 332 may be designed to process four or more bins per clock cycle. Additional circuitry may be needed within low power CABAC decoder 332 to process additional bins per clock cycle and additional access ports may be needed for shared memory resources used in decoding the additional bins per clock cycle.

Low Power CABAC Unit

Embodiments of the present invention enable low power CABAC decoder 332 to decode one or more bins per clock cycle, based on parameters of a current video format, thereby allowing video decoder 290 to advantageously operate at a lower clock frequency for reduced power dissipation.

Figure 4A:
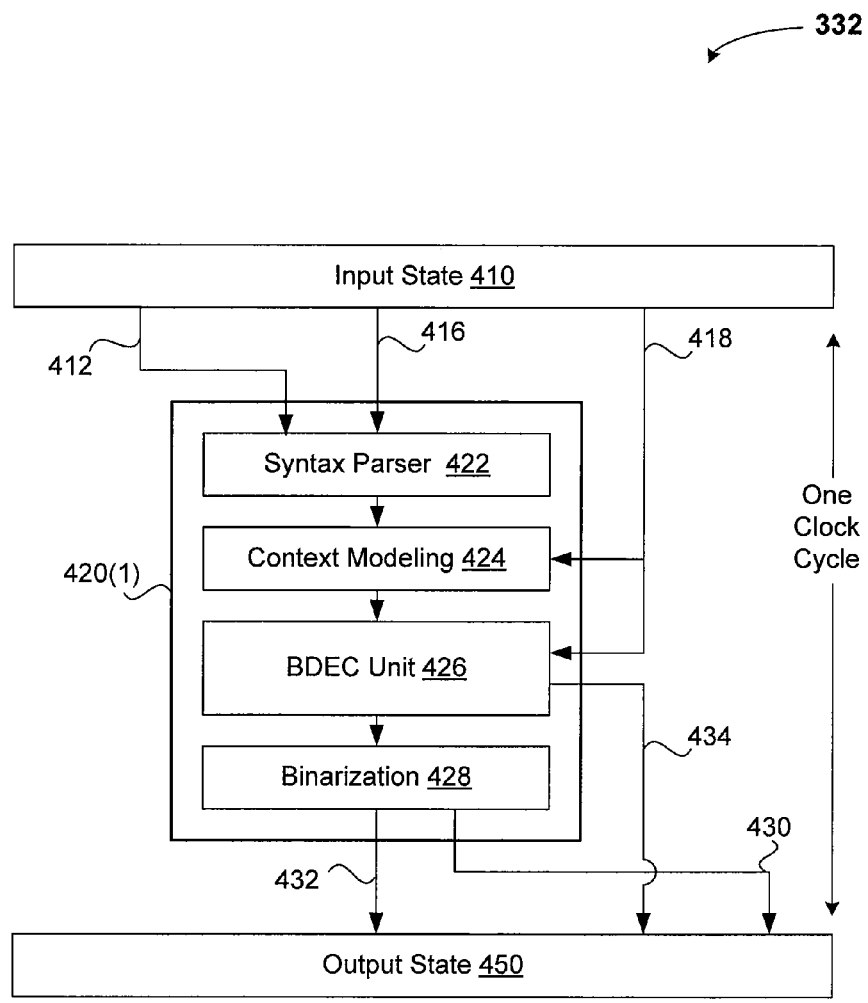
FIG. 4A is a conceptual diagram of a CABAC unit configured to decode one bin per clock cycle, according to one embodiment of the present invention.

FIG. 4A is a conceptual diagram of low power CABAC unit 332 of FIG. 3, configured to decode one bin per clock cycle, according to one embodiment of the present invention. Input state 410 is transmitted to CABAC bin decoder logic 420(1), which generates output state 450. Input state 410 comprises input stream data 412, syntax state information 416 (associated a parse state for previously parsed stream data), and context and probability model information 418 (associated with the previously decoded bin). Output state 450 comprises decoded data 430, syntax state information 432, and context and probability model information 434. In operation, input stream data 412 represents a sequentially sampled portion of compressed stream 312 and decoded data 430 represents a corresponding decompressed representation of input stream data 412. In each clock cycle, one bin associated with input stream data 412 is processed to generate decoded data 430.

CABAC bin decoder logic 420(1) includes syntax element parser 422, context modeling unit 424, binary arithmetic decoder (BDEC) unit 426 and binarization unit 428. Syntax parser 422 is configured to receive input stream 412 and decode an internal structure of the input stream, including slice headers. Context modeling unit 424 includes a context table. In one embodiment, the context table is accessed using a syntax base identifier, bin identifier, and offset generated by the syntax parser 422 and context and probability model information 418 to generate an arithmetic code to be decoded by BDEC unit 426. As each bin is decoded by BDEC unit 426, context and probability model information 434 is saved in a current clock cycle for use as context and probability model information 418 in a subsequent clock cycle. Similarly, syntax state information 432 is saved in a current clock cycle for use as syntax state information 416 in a subsequent clock cycle. Syntax state information 432 includes current decode state information for determining, without limitation, that decoder CABAC bin decoder logic 420(1) should initialize a context table, initialize a probability model, decode next syntax element, or decode a subsequent bin. Binarization unit 428 generates decoded data 430 and syntax state information 432. Decoded data 430 may comprise more bits of data than input stream 412. Output state 450 may be stored or accumulated within a register circuit for transmission to other circuits within video decoder 290. For example, accumulated residue data may be transmitted to inverse transform unit 334 for reconstructing macroblock color information.

Figure 4B:
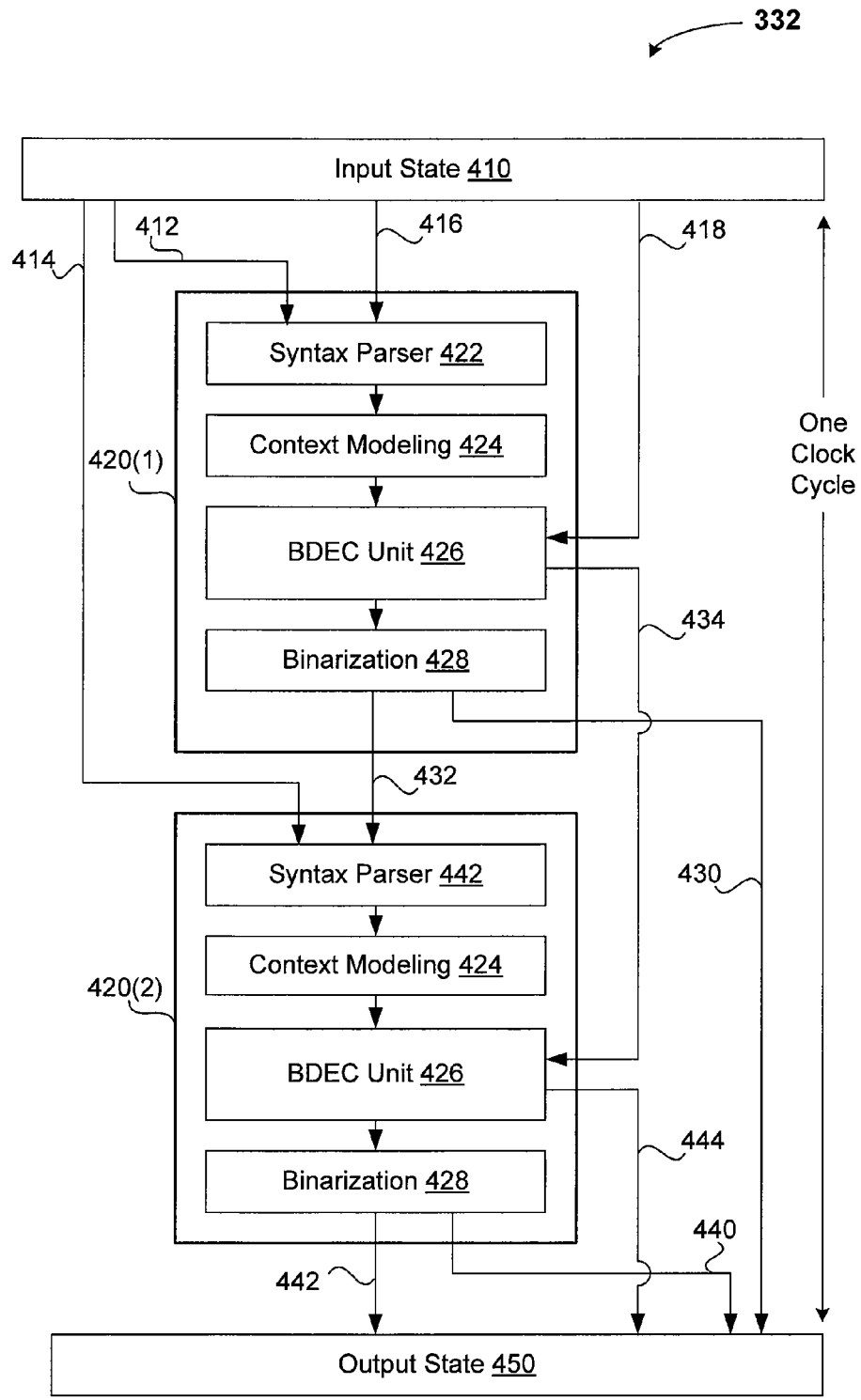
FIG. 4B is a conceptual diagram of a CABAC unit configured to decode two bins per clock cycle, according to one embodiment of the present invention.

FIG. 4B is a conceptual diagram of low power CABAC unit 332 of FIG. 3, configured to decode two bins per clock cycle, according to one embodiment of the present invention. As shown, two instances of decoder logic 420(1) from FIG. 4A are cascaded sequentially, so that serial dependence of decoded data is fed from decoder logic 420(1) to decoder logic 420(2) within a single clock cycle. Syntax state information 442, context and probability model information 444, and decoded data 440 are analogous to syntax state information 432, context and probability model information 434, and decoded data 430, but apply for two sequentially decoded bins rather than one decoded bin illustrated in FIG. 4A. A context table associated with context modeling unit 424 may be implemented as a register file configured to have access ports for each of two or more instances of context modeling unit 424. Similarly, a probability model associated with BDEC unit 426 may be implemented as a register file configured to have access ports for each of two or more instances of BDEC unit 426.

Persons skilled in the art will recognize that, while low power CABAC unit 332 has been taught herein for configurations that decode one bin per clock cycle and two bins per clock cycle, other configurations may be implemented to decode three or more bins per clock cycle. In one embodiment, video decoder 290 includes a clock source having a programmable frequency. In another embodiment, video decoder 290 includes a clock source having a programmable frequency and a power supply having a programmable voltage. In one implementation, the programmable voltage may be shut off to one or more inactive instances of decoder logic 420.

Figure 5:
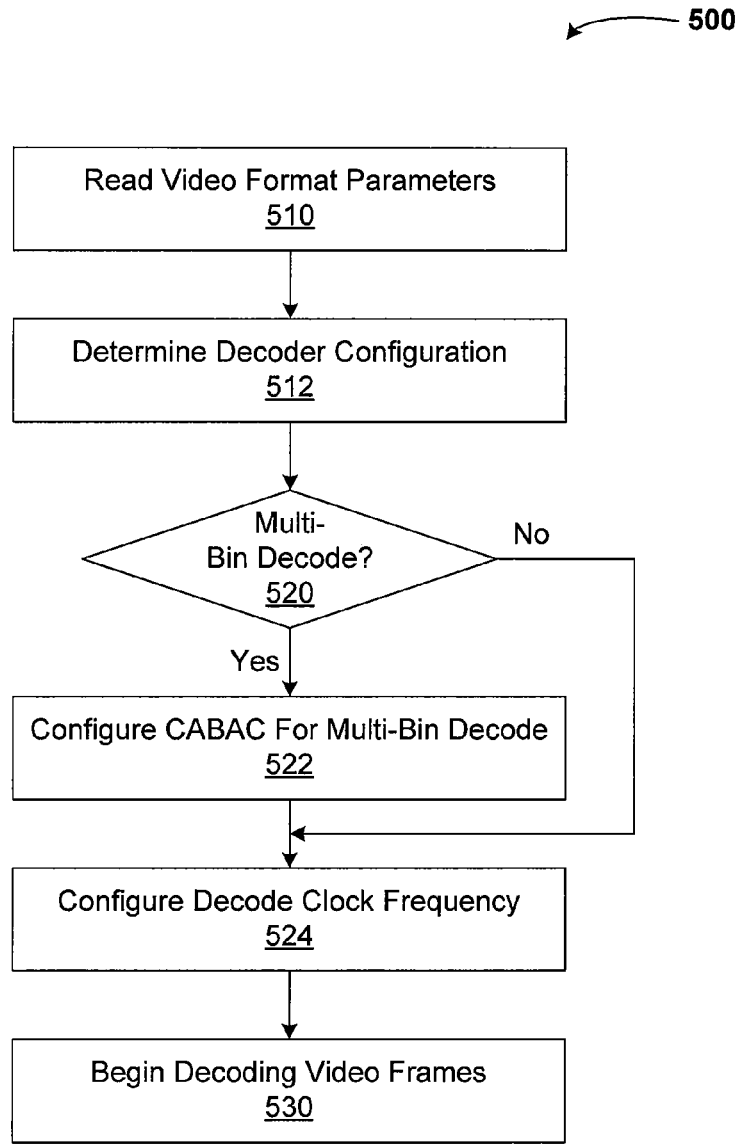
FIG. 5 is a flow diagram of method steps for configuring a CABAC unit to operate on a selected number of bins per clock cycle, according to one embodiment of the present invention.

FIG. 5 is a flow diagram of method steps for configuring a CABAC unit to operate on a selected number of bins per clock cycle, according to one embodiment of the present invention. Although method 500 is described in conjunction with the systems of FIGS. 1, 2, 3A, and 3B, persons of ordinary skill in the art will understand that any system configured to perform the method steps, in any order, is within the scope of the invention. In one embodiment, the method steps are performed by video decoder 290 of FIG. 3. In an alternative embodiment, device driver 103 of FIG. 1 is configured to implement the method steps.

As shown, a method 500 begins in step 510, where video decoder 290 of FIG. 3 reads video format parameters within compressed stream 312. The video format parameters indicate frame resolution, frame rate, and related information needed to decode compressed stream 312. In step 512, video decoder 290 determines a decoder configuration based on the video format parameters. Decoder configuration includes, without limitation, a required operating clock frequency to process compressed stream 312 and to generate output video frames 314, and how many bins should be processed per cycle by low power CABAC decoder 332.

In step 520, video decoder 290 determines whether multi-bin decoding per clock should be performed by low power CABAC decoder 332. If, in step 520, multi-bin decoding per clock cycle should be performed by low power CABAC decoder 332, then the method proceeds to step 522, where video decoder 290 configures low power CABAC decoder 332 for multi-bin decoding. As a general matter, multi-bin decoding includes decoding two or more bins per clock cycle.

In one embodiment, determining that multi-bin decoding should be performed includes determining that two or more cascaded instances of CABAC bin decoder logic 420 may properly operate at a clock frequency for video decoder 290 that otherwise satisfies processing requirements associated with compressed stream 312. In certain embodiments, a lookup table includes an entry for each supported combination of video format parameters, and defines a required clock frequency, and a number of bins per clock frequency based on the video format parameters. In such embodiments, determining that multi-bin decoding should be performed is accomplished by looking up an entry within the lookup table corresponding to the video format parameters. In one embodiment, configuring low power CABAC decoder 332 for multi-bin decoding includes switching certain data multiplexors to direct data flow along a cascade of two or more instances of CABAC bin decoder logic 420. In certain embodiments, configuring low power CABAC decoder 332 includes disabling a system clock associated with inactive instances of CABAC decoder logic 420. In other embodiments, configuring low power CABAC decoder 332 includes powering off inactive instances of CABAC decoder logic 420.

Returning to step 520, if multi-bin decoding per clock cycle should not be performed by low power CABAC decoder 332, then the method proceeds to step 524, where video decoder 290 configures an operating clock frequency for processing compressed stream 312. In one embodiment, configuring the operating clock frequency includes programming a clock source to generate the operating clock frequency. The method terminates in step 530, where video decoder 290 begins decoding video frames from compressed stream 312.

In sum, a technique is disclosed for configuring a low power CABAC decoder to operate on one or more bins per clock cycle. A number of bins to be processed per clock cycle is determined based on video format parameters that define a required clock frequency for a video decoder pipeline to process an associated compressed stream. The number of bins per clock cycle corresponds to a number of cascaded instances of CABAC bin decoder logic that may operate properly within one clock cycle of the required clock frequency. Although embodiments of the present invention describe a configurable CABAC unit, persons skilled in the art will recognize that any iterative entropy decoder configured to decode a variable number of units of data per clock cycle is within the scope and spirit of the present invention.

One advantage of the present invention is that a video decoder may reconfigure a context-based adaptive binary arithmetic coding (CABAC) decoder circuit to decode a number of bins corresponding to reduced power consumption based on a specific item of video content being decoded.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

In view of the foregoing, the scope of embodiments of the present invention is defined by the claims that follow.

What is claimed is:

1. A method for configuring a decoder circuit to decode one or more units of encoded video data per processing cycle, the method comprising:

reading values of one or more video format parameters comprising at least one parameter selected from a set of parameters including a video frame resolution, a video frame rate, and a video compression rate associated with the encoded video data;

based on the values of the at least one parameter selected from the set of parameters including the video frame resolution, the video frame rate, and the video compression rate, making a determination that more than one decoder bin, instead of only one decoder bin, should be processed per processing cycle; and in response to the determination, configuring the decoder circuit to process the more than one decoder bin per processing cycle.

2. The method of claim 1, further comprising programming a clock source for the decoder circuit to operate at a frequency associated with the more than one bin per processing cycle.

3. The method of claim 1, further comprising disabling a system clock for at least one inactive portion of the decoder circuit.

4. The method of claim 1, further comprising powering off at least one inactive portion of the decoder circuit.

5. The method of claim 1, further comprising performing a lookup table access based on the values of the one or more video format parameters.

6. The method of claim 1, wherein the decoder circuit is configured to implement context-based adaptive binary arithmetic coding.

7. The method of claim 1, wherein the decoder circuit is coupled to an inverse transform circuit and a reconstruction circuit to form a video decoder, configured to generate sequential video frames based on the encoded video data.

8. A non-transitory computer-readable storage medium including instructions that, when executed by a processing unit, cause the processing unit to configure a decoder circuit to decode one or more units of encoded video data per processing cycle, by performing the steps of:

reading values of one or more video format parameters comprising at least one parameter selected from a set of parameters including a video frame resolution, a video frame rate, and a video compression rate associated with the encoded video data;

based on the values of the at least one parameter selected from the set of parameters including the video frame resolution, the video frame rate, and the video compression rate, making a determination that more than one decoder bin, instead of only one decoder bin, should be processed per processing cycle; and in response to the determination, configuring the decoder circuit to process the more than one decoder bin per processing cycle.

9. The non-transitory computer-readable storage medium of claim 8, further comprising programming a clock source for the decoder circuit to operate at a frequency associated with the more than one bin per processing cycle.

10. The non-transitory computer-readable storage medium of claim 8, further comprising disabling a system clock for at least one inactive portion of the decoder circuit.

11. The non-transitory computer-readable storage medium of claim 8, further comprising powering off at least one inactive portion of the decoder circuit.

12. The non-transitory computer-readable storage medium of claim 8, further comprising performing a lookup table access based on the values of the one or more video format parameters.

13. The non-transitory computer-readable storage medium of claim 8, wherein the decoder circuit is configured to implement context-based adaptive binary arithmetic coding.

14. The non-transitory computer-readable storage medium of claim 8, wherein the decoder circuit is coupled to an inverse transform circuit and a reconstruction circuit to form a video decoder, configured to generate sequential video frames based on the encoded video data.

15. A computing device, comprising:
   a system memory configured to store and retrieve encoded video data;
   a central processing unit coupled to the system memory and configured to execute instructions stored in the system memory and to store computation results in the system memory;
   a parallel processing subsystem coupled to the central processing unit and to the system memory, comprising a video decoder configured to:
      read values of one or more video format parameters comprising at least one parameter selected from a set of parameters including a video frame resolution, a video frame rate, and a video compression rate associated with the encoded video data;
      based on the values of the at least one parameter selected from the set of parameters including the video frame resolution, the video frame rate, and the video compression rate, make a determination that more than one decoder bin, instead of only one decoder bin, should be processed per processing cycle; and
      in response to the determination, configure the decoder circuit to process the more than one decoder bin per processing cycle.

16. The computing device of claim 15, wherein the video decoder is further configured to program a clock source for the decoder circuit to operate at a frequency associated with the more than one bin per processing cycle.

17. The computing device of claim 15, wherein the video decoder is further configured to perform at least action selected from a set of actions including disabling a system clock for one or more inactive portions of the decoder circuit and powering off one or more inactive portions of the decoder circuit.

18. The computing device of claim 15, wherein to determine a decoder configuration, the video decoder performs a lookup table access based on the values of the one or more video format parameters.

19. The computing device of claim 15, wherein the decoder circuit is configured to implement context-based adaptive binary arithmetic coding.

20. The computing device of claim 15, wherein the video decoder comprises the decoder circuit, an inverse transform circuit, and a reconstruction circuit configured to generate sequential video frames based on the encoded video data, for display on a display device.

21. The method of claim 1, wherein each of the more than one decoder bin comprises a context-based adaptive binary arithmetic coding (CABAC) bin that stores a binary value that represents the encoded video data.

22. The method of claim 1, further comprising determining that multi-bin decoding per clock is enabled based on a decoder configuration.

23. The non-transitory computer-readable storage medium of claim 8, further comprising reducing, based on the values of the at least one parameter selected from the set of parameters including the video frame resolution, the video frame rate, and the video compression rate, an operating clock frequency for the decoder circuit to enable more than one decoder bin to be processed per clock cycle.

* * * * *